Patented June 22, 1948

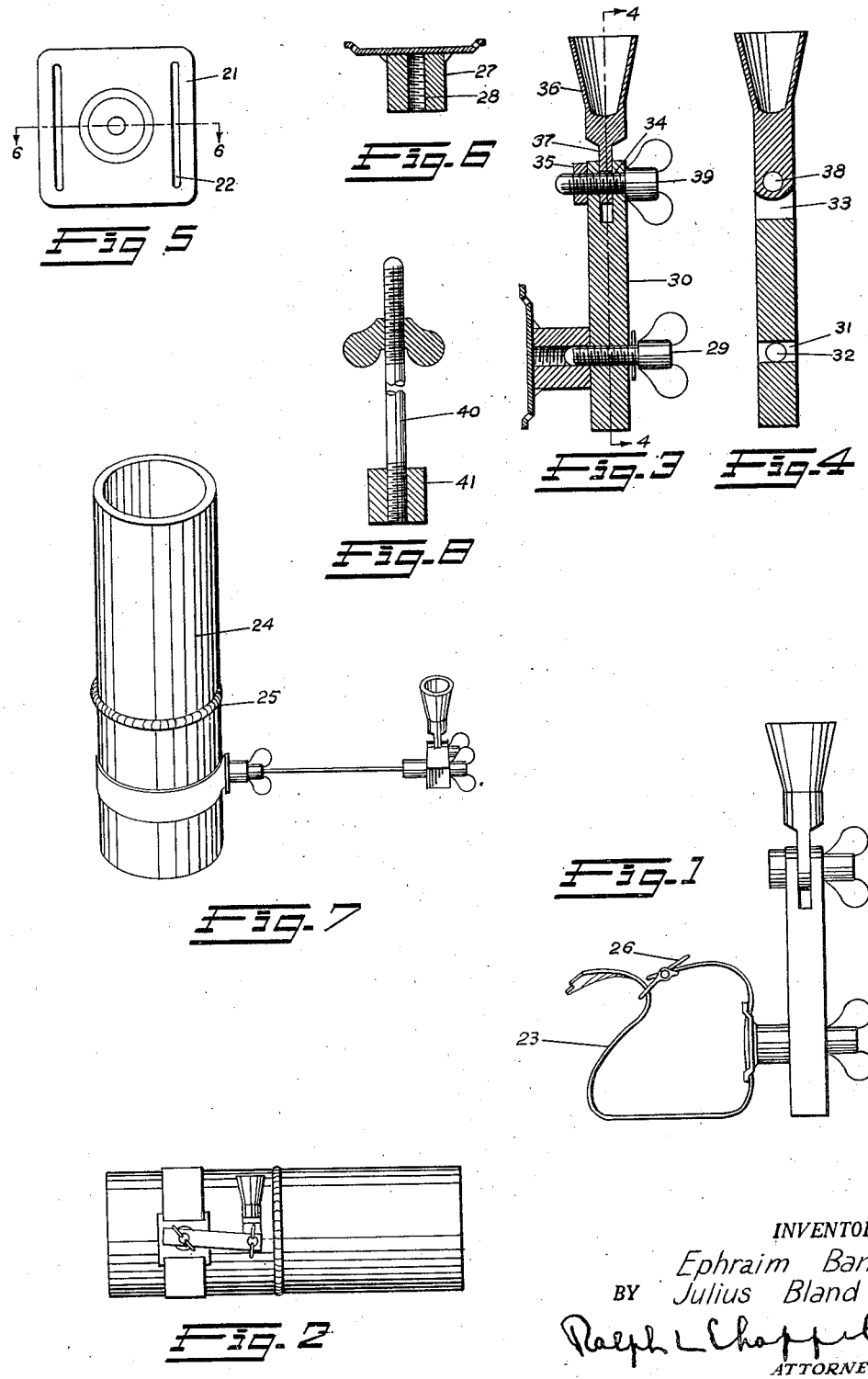

2,443,591

UNITED STATES PATENT OFFICE 2,443,591

RADIUM HOLDER

Ephraim Banks, Brooklyn, and Julius Bland, Long Island City, N. Y.

Application June 7, 1945, Serial No. 598,186

2 Claims. (Cl. 248—231)

(Granted under the act of March 3, 1883, as amended April 30, 1928; 370 O. G. 757)

This invention relates to adjustable holders, more particularly to such a holder for positioning the radium in field radiography, particularly in the case of pipe welds on board ship.

The field examination of welds in high-pressure steam piping has developed an important branch of radium radiography, which has resulted from the difficulty encountered in the positioning of X-ray tubes, especially where the pipe welds exist at elevations or locations inaccessible to the control unit of the X-ray machine.

The general procedure in such gamma-ray examinations of pipe welds includes making several exposures of the weld circumferences, which requires repositioning of the radium holder for each length of arc covered. It should be understood that the technique under consideration is based on exposure through both walls of the pipe and requires that the radium be offset from the plane of the weld, resulting in the recording of that part of the weld in contact with a film placed against it. The repositioning of the radium holder, when using a standard tripod has proved unsatisfactory because of limitations in the length of the holder and unavailability of adequate stagings.

An object of this invention is to provide an adjustable holder for positioning radium in field radiography.

Another object is to provide in a holder of this character a base support adapted to fit several sizes of pipe to be radiographed.

A further object is to provide a holder of this character whereby the radium retaining means is adjustable relative to the base support.

A still further object is to provide in a holder of this character a base support, a radium retainer, and a connection therebetween that permits adjustment of the radium retainer in either of two planes relative to the base support.

Another object is to provide in a holder of this character, a base support, a radium retainer, a connecting link between the retainer and support, and means whereby said radium retainer can be swiveled about said connecting link.

Further objects and advantages of this invention, as well as its construction, arrangement, and operation will be apparent from the following description and claims in connection with the accompanying drawing, in which Fig. 1 is a side elevation of a radium holder according to one embodiment of the invention.

Fig. 2 is a side elevation showing the radium holder of Fig. 1 attached to a horizontal pipe having a weld to be radiographed.

Fig. 3 is a longitudinal section through the radium holder shown in Fig. 1.

Fig. 4 is a longitudinal section taken along the line 4—4 in Fig. 3.

Fig. 5 is a top plan view of the base support forming a part of the radium holder shown in Fig. 1.

Fig. 6 is a vertical section taken along the line 6—6 of Fig. 5.

Fig. 7 is a perspective view showing the radium holder attached by means of an extension rod, to a vertical pipe having a weld to be radiographed.

Fig. 8 is a longitudinal section through the extension rod and bushing shown in Fig. 7.

In the drawing 21 is a thin steel base plate having a pair of slots 22 for receiving a web strap 23, which may be passed around a pipe 24 having a weld 25 to be radiographed. The open ends of the strap 23 may be fastened together by any suitable means, as by buckle 26. Fixedly secured to base plate 21 is a steel bushing 27 having internal threads 28 adapted to receive a wing nut 29 to adjustably secure a bar or connecting link 30 to base plate 21. Bar 30 is provided with two bores 31 and 32 formed at right angles to each other near one end thereof in order that said bar may be adjustably secured to base plate 21 in either of two positions at right angles to each other. At the opposite end of bar 30 there is a slot 33 and a bore 34 formed perpendicular to slot 33. A nut 35 is rigidly secured to one side of bar 30 in such a position that the internal threads of said nut are in alignment with bore 34. A radium-retaining member 36 in the form of a cup having an extension 37 with a bore 38 therethrough is adjustably secured to bar 30 by means of a thumbscrew 39 as shown in Fig. 3.

In the operation of the invention, cup member 36 can be swiveled through 180° with respect to bar 30 and bar 30 can be rotated through 360° and can be secured in any desirable position therein with respect to bushing 27. As heretofore stated, bores 31 and 32 are provided in order that bar 30 can be mounted on bushing 27 in either of two positions at right angles to each other.

As shown in Figs. 7 and 8, an extension rod 40 having a bushing 41 is provided for use when it is desirable to vary the radium-film distance. Rods of different lengths can be used to secure any desirable distance.

From the above description of construction and arrangement of the elements of the present invention it is clear that there is provided a base support adapted to fit several sizes of pipe and means are provided whereby the radium retainer can be quickly and adjustably fixed in any desirable location with respect to the pipe to be radiographed.

It is to be understood that various modifications and changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. In a holder for retaining radium in a fixed position relative to a pipe to be radiographed, a plate having a pair of slots therein, a flexible strap cooperable with said slots to fasten said plate to said pipe, a bushing rigidly secured to said plate, a bar having a pair of bores formed perpendicular to each other near one end thereof, a thumb screw adjustably connecting said bushing and said bar, a slot in the opposite end of said bar having a bore passing therethrough perpendicular to said slot, whereby a cup-shaped radium retainer having a drilled stem extending from the closed end thereof may be mounted in said slot, and a thumb screw in said last mentioned bore for adjustably connecting the extension to said bar.

2. In a holder for retaining radium in a fixed position relative to a pipe to be radiographed, a plate having a pair of slots, a flexible strap cooperable with said slots to fasten said plate to said pipe, a bushing rigidly secured to said plate, a bar having a pair of bores formed at 90° to each other near one end thereof and a slot for rotatably mounting a radium retainer, said slot having a bore formed in a transverse direction to said slot near the opposite end thereof, and a stud bolt operatively connecting said bushing and said bar.

EPHRAIM BANKS.
JULIUS BLAND.

REFERENCES CITED

The following references are of record in the file of this patent:

UNITED STATES PATENTS

| Number | Name | Date |
| --- | --- | --- |
| 161,517 | Keam | Mar. 30, 1875 |
| 568,328 | Bevin et al. | Sept. 29, 1896 |
| 980,742 | Bartholomew | Jan. 3, 1911 |
| 1,074,272 | Kline | Sept. 30, 1913 |
| 1,095,242 | Swift | May 5, 1914 |
| 1,176,203 | Comer | Mar. 21, 1916 |
| 1,858,564 | See | May 17, 1932 |
| 1,898,866 | Bragger | Feb. 21, 1933 |
| 2,212,635 | Deer | Aug. 27, 1940 |